United States Patent Office 2,973,326
Patented Feb. 28, 1961

2,973,326

PROCESS FOR REGENERATING AN IRON-MOLYBDENUM CONTAINING OXIDATION CATALYST

Theodore S. Hodgins and Frederic J. Shelton, Seattle, Wash., assignors to Reichhold Chemicals, Inc., Detroit, Mich.

No Drawing. Filed Nov. 26, 1954, Ser. No. 471,504

4 Claims. (Cl. 252—412)

The present invention relates to an improvement in process for the regeneration of an iron-molybdenum containing catalyst suitable for the oxidation of alcohols to aldehydes.

In copending applications Serial Nos. 452,684 and 452,685, now Patents Nos. 2,812,309 and 2,812,308, respectively, are described processes for the manufacture and use of iron oxide-molybdenum oxide catalysts suitable for the production of aldehydes from alcohols. The catalysts employed are in general complex salt precipitates having a molar ratio of $MoO_3$ to $Fe_2O_3$ varying from 3.6 to 11.1.

When such a catalyst is used, the useful working life of the catalyst is about thirty-five days of favorable operation. At the end of this time the catalyst is a light slightly greenish gray color and may be regenerated in situ or preferably screened on a screen having four to the inch mesh and the material larger than four mesh discarded. The spent catalyst passing through the four mesh screen is screened on a twenty mesh screen and the material retained on the twenty mesh screen is regenerated according to our invention. According to our analysis on certain batches of catalyst the $MoO_3$ content of the fresh catalyst is in the order of 86%. The $MoO_3$ content of the spent catalyst is in the order of 78%. The loss in $MoO_3$ we attribute to volatilization. Vapor pressure of $MoO_3$ at 800° C. is 0.01 atm. The rate of sublimation is appreciable at 700° C. A spent catalyst always shows a great number of $MoO_3$ crystals.

We believe that the loss in the catalytic activity of $MoO_3$ containing catalyst is due in part to physical loss by volatilization and also the redistribution of the remaining $MoO_3$ selectively in microscopic crystals on the remainder of the spent catalyst or catalyst support so that the overall efficiency is impaired. This redistribution of the $MoO_3$ apparently separates the original amorphous $MoO_3$ from the amorphous iron oxide originally in contact with it and the active centers of catalytic activity are thereby lost. This effect has been followed by the change in X-ray diffraction patterns. The original catalyst shows no pattern but as the catalyst is used the strong distinct pattern of crystalline $MoO_3$ becomes apparent.

We have found that a convenient method of reconstituting the original catalyst by redistributing the $MoO_3$ and returning it to amorphous form is to treat the spent catalyst in situ with an alkaline solution of an amine, a suitable amine being ammonia or a substituted ammonia more basic than ammonia, such as methyl amine. In our process the amine solution is added in sufficient quantity to cover the catalyst in situ and must have sufficient amine present to dissolve the local high concentration of $MoO_3$ and redistribute the $MoO_3$ over the surface of the amorphous iron oxide where it forms the well known water insoluble molybdenum oxide-iron oxide complex. In some cases we may add $MoO_3$ in the form of a soluble molybdenum salt in order to bring the $MoO_3$ content of the finished regenerated catalyst up to a suitable concentration of $MoO_3$.

The preferred embodiment of the present invention is to remove the spent catalyst from the converter and screen it first through a four and then through a twenty mesh screen. The fine material passing through the twenty mesh screen is rich in $MoO_3$ and is dissolved in an amine solution of suitable concentration to dissolve substantially all of the $MoO_3$. This solution is filtered free of the insoluble material present and the solution of amine molybdate is added to the coarse mesh spent catalyst retained on the twenty mesh screen to rejuvenate it by soaking in this solution, which may be diluted with water to completely cover the coarse mesh spent catalyst. If desired additional soluble molybdenum salt may be added to increase the $MoO_3$ content of the finished rejuvenated catalyst. This produces a catalyst precursor which has a somewhat greater physical strength than the catalyst of Patent No. 2,812,309 and must be dried and activated in similar fashion.

Another embodiment of our invention is to treat the spent catalyst passed through a four mesh screen and retained on a twenty mesh screen with an organic solution containing molybdenum, such as molybdenum dichloride dissolved in a substantially anhydrous alcohol, thereby replacing the molybdenum values for any $MoO_3$ which has been lost. This procedure has the advantage of being anhydrous and does not disrupt the structure of the catalyst to any great extent. This may also be done with the catalyst in situ. The use of an anhydrous organic solution of a compound of molybdenum greatly reduces the time required for subsequent drying and activation of the catalyst precursor as it is substantially anhydrous and the molybdenum compound need only be converted to $MoO_3$ by hot air blowing to activate the catalyst.

*Example I*

An iron oxide-molybdenum oxide catalyst precursor was prepared in glass lined and porcelain equipment as follows:

(1) 25 pounds, 2 ounces of C.P. grade ferric chloride ($FeCl_3.6H_2O$) were dissolved in 150 gallons of water initially at 70° F. The pH of the resulting solution was about 1.7.

(2) In a separate vessel 56 pounds, 6 ounces of C.P. grade ammonium heptamolybdate

$$((NH_4)_6Mo_7O_{24}.4H_2O)$$

were dissolved in 100 gallons of water initially at 125° F. The pH of the resulting solution was approximately 5.3. This pH was adjusted to 2.25 using about 12 pounds of C.P. grade hydrochloric acid (12 Normal).

(3) The ammonium molybdate solution was then added slowly with efficient rapid agitation to the ferric chloride solution, the total elapsed time being about one hour.

(4) The resulting greenish yellow precipitate was allowed to settle for about six hours and the supernatant liquid siphoned off. The settled precipitate was then washed with cold water in two separate portions of about 20 gallons apiece, the precipitate being allowed to settle for four hours after each wash before siphoning off the wash water.

(5) The resulting slurry was then vacuum filtered to a cake thickness of 1.5 inches.

(6) Upon removal from the filter the cakes were placed on ventilated racks and air dried for five days at room temperature.

(7) Further drying consisted of the following:

(a) Forty-eight hours at 175° F.
(b) Seventy-two hours at 225° F.
(c) Filter cakes turned over and broken up into chunks one mesh or less in size, and then dried for twenty-four hours at 300° F.

(8) The dried catalyst precursor was then comminuted to −8+20 mesh.

(9) This catalyst precursor was loaded into a converter consisting of a series of one inch O.D. 13 gauge boiler tubes operating in parallel. The catalyst tubes were surrounded by a heat transfer medium to permit the heat treatment of the catalyst. The catalyst precursor was poured into the tubes without any tamping to a depth of twenty-three inches. The heat transfer medium was then gradually warmed up from room temperature to approximately 200° F. and air was gently blown through at a space velocity of 25 per minute. The temperature of the heat transfer medium was then raised slowly over a period of three hours from 200° F. to 500° F. and held at that temperature until no further trace of water or ammonia was detected in the exhaust gas.

The catalyst precursor has then been converted into an active catalyst possessing suitable physical properties to permit the long efficient production of formaldehyde.

This catalyst was used to produce formaldehyde by air oxidation of methanol and was in operation for thirty-four days at which time the production was 1,250 pounds of 37% formaldehyde solution per cubic foot of catalyst per day. The maximum rate of production was reached on the twentieth day of operation and was 1,500 pounds of 37% formaldehyde solution per cubic foot per day.

In regenerating this catalyst a methyl amine solution 3% by weight was poured into each tube to cover the twenty-two inches of spent catalyst in the tubes and was allowed to remain in contact for one hour at 70° F. At the end of that time the excess solution was drained and warm air was passed through the catalyst bed in a gentle stream. The air was heated to about 180° F. prior to entering the catalyst tubes and was passed through the catalyst to be regenerated at a space velocity of ten/minute. This was continued until the wet bulb temperature of the exit gas was 80° F. At this time the temperature was gradually increased to 495° F. over a period of ten hours and the catalyst was then ready for operation with renewed activity. A 9% by weight methanol in air mixture was passed through this catalyst bed to produce initially 1,310 pounds of 37% formaldehyde solution per cubic foot of catalyst per day. The rate of production slowly increased to a maximum eighteenth day of 1,465 pounds of 37% formaldehyde solution per cubic foot of catalyst per day and then slowly decreased to 1,200 pounds of 37% formaldehyde solution per cubic foot of catalyst per day on the twenty-ninth day of operation. At this time operation was discontinued.

*Example II*

A catalyst prepared according to the procedure of Example I and operated for forty days finally having a production rate of 1,190 pounds of 37% formaldehyde solution per cubic foot of catalyst per day. Operation was then discontinued and the catalyst removed from the tubes and screened to separate material larger than four mesh and smaller than twenty mesh from the bulk of the spent catalyst. About 2% was over four mesh and 7% was finer than twenty mesh. The fine material was largely crystalline $MoO_3$. The total catalyst removed was 390 pounds.

The material finer than twenty mesh was covered with 28% aqua ammonia and allowed to stand one hour, at which time the insoluble material was filtered off. The filtrate was diluted with water and was used to cover and treat the material having a mesh size between four and twenty mesh. After twenty minutes as much liquid as possible was drained off and the catalyst precursor was air dried for five days, oven dried at 220° F. for sixteen hours, and then placed in the tubes in the converter. This provided a catalyst depth of twenty inches. The activation was carried out in identical fashion to that of Example I. Then, as in Example I, a methanol-air mixture was blown through the catalyst tubes and an initial production rate of 1,370 pounds of 37% formaldehyde per cubic foot of catalyst per day was obtained. A peak production rate of 1,510 pounds of formaldehyde was obtained after twenty-two days of operation. Production was stopped after forty-seven days of operation, at which time the production rate had dropped to 1,250 pounds.

*Example III*

A catalyst prepared according to the procedure of Example I and operated for thirty-eight days finally having a production rate of 1,170 pounds of 37% formaldehyde solution per cubic foot of catalyst per day. At this time operation was discontinued and the catalyst regenerated in place by covering the catalyst in the tubes with a saturated solution of molybdenum dichloride in ethanol. This solution was allowed to remain in contact with the solid phase spent catalyst for twenty minutes and was then drained off. The converter was then reassembled and a gentle stream of warm air was blown through until no further odor of alcohol was noted in the exhaust gas. At this time the temperature was gradually increased from 90° F. to 490° F. over a period of ten hours with air at a space velocity of twenty/minute passing through the catalyst bed. The catalyst was then ready for use and a 9% by weight methanol-air mixture was blown through to give an initial production rate of 1,318 pounds of 37% formaldehyde solution. A maximum production rate of 1,460 pounds of 37% formaldehyde was obtained on the eighteenth day and production was stopped on the twenty-fourth day when a rate of 1,210 pounds was reached.

This process may be applied to catalysts carried on any suitable support, such as silicon carbide and the like.

The invention has been described in detail for the purpose of illustration but it will be obvious that numerous modifications and variations may be resorted to within the scope of the appended claims without departing from the spirit of the invention.

We claim:

1. A process for regenerating an iron oxide-molybdenum oxide catalyst whose activity has been reduced by loss of $MoO_3$, wherein the catalyst comprises a major portion of molybdenum oxide and a minor portion of iron oxide, and is suitable for use in the oxidation of alcohols to aldehydes; which process comprises treating the spent catalyst by contacting it with a non-oxidizing compound of molybdenum in solution, which does not affect the iron oxide, for a period of about 20 minutes to 1 hour to restore the lost $MoO_3$ substantially to its original strength, drying the treated spent catalyst by contact with warm air to remove the solvent, and further heating said spent catalyst at a temperature substantially within the range of 220° F. to 495° F. for a period substantially within the range of 10 hours to 16 hours, depending on the temperature, to restore the catalytic activity at least in part.

2. A process as set forth in claim 1 wherein the compound of molybdenum in solution comprises a saturated solution of molybdenum dichloride in ethanol.

3. A process as set forth in claim 2 wherein the saturated solution of molybdenum dichloride in ethanol is allowed to remain in contact with the spent catalyst for about 20 minutes and is then drained off prior to drying.

4. A process as set forth in claim 2 wherein the saturated solution of molybdenum dichloride in ethanol is allowed to remain in contact with the spent catalyst for about 20 minutes and is then drained off prior to drying, and after drying the temperature is increased to about 490° F. and the heating continued for about 10 hours.

References Cited in the file of this patent

UNITED STATES PATENTS

| | | |
|---|---|---|
| 1,913,405 | Meharg | June 13, 1933 |
| 2,330,174 | Hachmuth | Sept. 21, 1943 |
| 2,570,067 | Myers | Oct. 2, 1951 |
| 2,579,123 | Pardee | Dec. 18, 1951 |
| 2,650,906 | Engel et al. | Sept. 1, 1953 |
| 2,666,086 | Pitzer | Jan. 12, 1954 |
| 2,683,122 | Woodcock | July 6, 1954 |